US008963950B2

(12) United States Patent
Murakami (10) Patent No.: US 8,963,950 B2
(45) Date of Patent: Feb. 24, 2015

(54) DISPLAY CONTROL APPARATUS AND DISPLAY CONTROL METHOD (75) Inventor: Tomoyuki Murakami, Saitama (JP)

(73) Assignee: Sony Corporation (JP)

(*) Notice: Subject to any disclaimer, the term of this patent is extended or adjusted under 35 U.S.C. 154(b) by 522 days.

(21) Appl. No.: 12/802,575

(22) Filed: Jun. 9, 2010

(65) Prior Publication Data

US 2011/0001763 A1 Jan. 6, 2011

(30) Foreign Application Priority Data

Jul. 3, 2009 (JP) ................ P2009-159149

(51) Int. Cl.
G09G 5/00 (2006.01)
H04N 5/445 (2011.01)
G09G 5/14 (2006.01)
H04N 21/4223 (2011.01)
H04N 21/431 (2011.01)
H04N 21/44 (2011.01)
H04N 21/4402 (2011.01)
H04N 21/442 (2011.01)

(52) U.S. Cl.
CPC ............ *H04N 5/44543* (2013.01); *G09G 5/14* (2013.01); *H04N 21/4223* (2013.01); *H04N 21/431* (2013.01); *H04N 21/44008* (2013.01); *H04N 21/440263* (2013.01); *H04N 21/44218* (2013.01); *G09G 2320/0261* (2013.01); *G09G 2340/0407* (2013.01); *G09G 2340/0464* (2013.01)
USPC ........... 345/619; 345/581; 345/660; 345/665; 345/670; 345/671; 345/684; 345/688

(58) Field of Classification Search
None
See application file for complete search history.

(56) References Cited

U.S. PATENT DOCUMENTS

| 2002/0046100 | A1 | 4/2002 | Kinjo | |
|---|---|---|---|---|
| 2002/0180799 | A1* | 12/2002 | Peck et al. | ................ 345/784 |
| 2008/0174551 | A1 | 7/2008 | Ishibashi | |
| 2009/0315869 | A1* | 12/2009 | Sugihara et al. | ............. 345/204 |

FOREIGN PATENT DOCUMENTS

| EP | 0816983 | A2 | 1/1998 |
|---|---|---|---|
| EP | 1426919 | A1 | 6/2004 |
| JP | 7-093089 | A | 4/1995 |
| JP | 7181939 | | 7/1995 |
| JP | 2001319217 | A | 11/2001 |

(Continued)

OTHER PUBLICATIONS

European Search Report EP 10166334, dated May 31, 2011.

(Continued)

*Primary Examiner* — Jwalant Amin
(74) *Attorney, Agent, or Firm* — Lerner, David, Littenberg, Krumholz & Mentlik, LLP (57) ABSTRACT There is provided a display control apparatus including a pickup image acquisition unit that acquires a pickup image of a viewer viewing a display image, a detection unit that detects a viewing position and a viewing distance of the viewer with respect to the display image based on the pickup image of the viewer acquired by the pickup image acquisition unit, and a display control unit that changes a size of the display image in accordance with the viewing distance of the viewer detected by the detection unit while associating the viewing position of the viewer detected by the detection unit with a display position of the display image.

13 Claims, 10 Drawing Sheets

(56) References Cited

FOREIGN PATENT DOCUMENTS

| | | |
|---|---|---|
| JP | 2004-213486 A | 7/2004 |
| JP | 2004185007 A | 7/2004 |
| JP | 2005050680 A | 2/2005 |
| JP | 2005333524 A | 12/2005 |
| JP | 2007081584 A | 3/2007 |
| JP | 2008-072561 A | 3/2008 |
| JP | 2008-181199 A | 8/2008 |
| JP | 2009087026 A | 4/2009 |

OTHER PUBLICATIONS

Office Action from Japanese Application No. 2009-159149, dated Jun. 25, 2013.

* cited by examiner

| No. | DISPLAY NUMBER | SIZE |
|---|---|---|
| h10 | 15 | 450 × 450 |
| h9 | 10 | 300 × 300 |
| h8 | 7 | 200 × 200 |
| h7 | 5 | 160 × 160 |
| ⋮ | ⋮ | ⋮ |

DISPLAY CONTROL APPARATUS AND DISPLAY CONTROL METHOD

CROSS-REFERENCE TO RELATED APPLICATION

The present application claims priority from Japanese Patent Application No. JP 2009-159149 filed in the Japanese Patent Office on Jul. 3, 2010, the entire content of which is incorporated herein by reference.

BACKGROUND OF THE INVENTION

1. Field of the Invention

The present invention relates to a display control apparatus and a display control method, and in particular, relates to a display control apparatus that controls the display of display images in accordance with a viewing position and a display control method.

2. Description of the Related Art

To display many pieces of content on a display screen as a list, still images representing content are generally displayed after the images being scaled down. The scaled-down display of still images representing content in this manner is called a thumbnail display. While the thumbnail display enables a viewer to confirm many pieces of content in one screen, there are issues such as very bad visibility and difficulty of distinguishing details of content depending on the viewing distance. For example, when many thumbnails are displayed on a big-screen TV and a viewer is positioned away from the display screen, there is an issue that the thumbnail display is too small to grasp details of content.

Thus, to enhance visibility of content, technologies to adjust audio output and adjust image quality in accordance with the environment around the viewer or the distance between the display device and viewer have been disclosed (for example, Japanese Patent Application Laid-Open No. H7-93089 and Japanese Patent Application Laid-Open No. 2008-72561). According to Japanese Patent Application Laid-Open No. H7-93089, for example, a part of the body of a viewer such as a nose is recognized and if the nose is brought closer to the display device, the display image is scaled up, and if the nose is moved away from the display device, the display image is scaled down. According to Japanese Patent Application Laid-Open No. 2008-72561, image quality and the character size are adjusted in accordance with the distance between the display screen and viewer.

SUMMARY OF THE INVENTION

However, according to Japanese Patent Application Laid-Open No. 7-93089 and Japanese Patent Application Laid-Open No. 2008-72561, while a display image can be scaled up/down in accordance with the distance between the display device and viewer, there is an issue that it is difficult to display thumbnails easily distinguishable from the position of the viewer by appropriately adjusting the size and number of thumbnail images in accordance with the position of the viewer.

In light of the foregoing, it is desirable to provide a novel and improved display control apparatus capable of appropriately making a thumbnail display in accordance with the distance or position of a viewer and a display control method.

According to an embodiment of the present invention, there is provided a display control apparatus, including: a pickup image acquisition unit that acquires a pickup image of a viewer viewing a display image; a detection unit that detects a viewing position and a viewing distance of the viewer with respect to the display image based on the pickup image of the viewer acquired by the pickup image acquisition unit; and a display control unit that changes a size of the display image in accordance with the viewing distance of the viewer detected by the detection unit while associating the viewing position of the viewer detected by the detection unit with a display position of the display image.

According to the above configuration, the viewing position and viewing distance of a viewer with respect to a display image are detected based on a pickup image of the viewer viewing the display image, and the size of the display image can be changed in accordance with the viewing distance while associating the detected viewing position of the viewer with the display position of the display image. Accordingly, a display screen can be caused to appropriately display a display image of thumbnails or the like in accordance with the distance or position of a viewer.

Further, the display control unit may cause a display screen to display a plurality of display images and associate the display position of one display image of the plurality of display images with the viewing position of the viewer to cause the display screen to display other display images around the one display image.

Further, the display control unit may control a display number of the plurality of display images in accordance with the viewing distance of the viewer.

Further, the display control unit may change the display number of the plurality of display images in accordance with the viewing distance of the viewer while associating the display position of one display image of the plurality of display images with the viewing position of the viewer.

Further, the one display image may be content being reproduced.

Further, the one display image may be the display image displayed on a full screen of the display screen.

Further, the detection unit may detect a line-of-sight position of the viewer based on the pickup image of the viewer acquired by the pickup image acquisition unit and the display control unit may select and display one display image from the plurality of display images in accordance with the line-of-sight position of the viewer detected by the detection unit.

Further, if the one display image is selected and displayed for a predetermined time or longer in accordance with the line-of-sight position of the viewer, the display control unit may cause the display screen to reproduce content associated with the one display image.

Further, the detection unit may detect a face direction of the viewer based on the pickup image of the viewer acquired by the pickup image acquisition unit and the display control unit may cause the plurality of display images displayed on the display screen to scroll in accordance with the face direction of the viewer or the line-of-sight position of the viewer.

Further, the display control unit may delete the display images positioned outside a displayable region of the display screen after causing the plurality of display images to scroll in a horizontal direction and cause the display screen to display other display images than the plurality of display images in the displayable region of the display screen where the plurality of display images is not displayed.

According to another embodiment of the present invention, there is provided a display control method, including the steps of: acquiring a pickup image of a viewer viewing a display image; detecting a viewing position and a viewing distance of the viewer with respect to the display image based on the acquired pickup image of the viewer; and changing a size of the display image in accordance with the detected viewing distance of the viewer while associating the detected viewing position of the viewer with a display position of the display image.

According to the present invention, as described above, a thumbnail display can appropriately be made in accordance with the distance or position of a viewer.

DETAILED DESCRIPTION OF THE EMBODIMENT(S)

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The "DETAILED DESCRIPTION OF THE EMBODIMENT(S)" will be described in the order shown below:

[1] Purpose of the Present Embodiment
[2] Hardware Configuration of Display Control Apparatus
[3] Function Configuration of Display Control Apparatus
[4] Details of Image Display Processing in Display Control Apparatus

[1] Purpose of the Present Embodiment

To display many pieces of content on a display screen as a list, still images representing content are generally displayed after the images being scaled down. The scaled-down display of still images representing content in this manner is called a thumbnail display. While the thumbnail display enables a viewer to confirm many pieces of content in one screen, there are issues such as very bad visibility and difficulty of distinguishing details of content depending on the viewing distance. For example, when many thumbnails are displayed on a big-screen TV and a viewer is positioned away from the display screen, there is an issue that the thumbnail display is too small to grasp details of content.

Thus, to enhance visibility of content, technologies to adjust audio output and adjust image quality in accordance with the environment around the viewer or the distance between the display device and viewer have been disclosed. For example, a technology is disclosed according to which a part of the body of a viewer such as a nose is recognized and if the nose is brought closer to the display device, the display image is scaled up, and if the nose is moved away from the display device, the display image is scaled down. Also, a technology is disclosed according to which image quality and the character size are adjusted in accordance with the distance between the display screen and viewer.

According to the above technologies in related art, however, while a display image can be scaled up/down in accordance with the distance between the display device and viewer, there is an issue that it is difficult to make a thumbnail display easily distinguishable from the position of the viewer by appropriately adjusting the size and number of thumbnail images in accordance with the position of the viewer. The above circumstances being focused on led to the creation of a display control apparatus 10 according to an embodiment of the present invention. According to the display control apparatus 10 in the present embodiment, a thumbnail display can appropriately be made in accordance with the distance or position of a viewer.

To check other programs or view other recorded content while a program received by a TV set or recorded content being reproduced, it was necessary to suspend the content being reproduced in the past. In such a case, it has been difficult to check other content or select other content while viewing content. According to the display control apparatus 10 in the present embodiment, however, if there is content being reproduced, the display control apparatus 10 can be caused to make a thumbnail display of other content without suspending the reproduction thereof. Further, when the display control apparatus 10 is caused to make a thumbnail display of other content, it becomes possible to adjust thumbnail positions or scale down thumbnails in accordance with the position of a viewer.

Recently, with digitization of TV broadcasting, a TV set handles not only reception and display of TV broadcasting, but also a multitude of pieces of multimedia content such as offerings of content via a network, reproduction of still images or music, and video reproduction from recording media. Accordingly, there is an issue that operations of the TV set become increasingly more complex and the number of buttons of a remote control increases, leading to lower usability. There is also an issue that due to portability of a remote control, there are many cases when the remote control is not found and it takes some time to detect the remote control or it is necessary to fetch the remote control each time the remote control is operated.

According to the present embodiment, as described above, the thumbnail display can be adjusted in accordance with the position of a viewer without operating the remote control. It also becomes possible to change the position of thumbnail display or to select content associated with a thumbnail by recognizing the orientation of the face or the line of sight of the viewer. When the viewer moves away from the display screen, visibility of thumbnails can be improved without remote control operation by scaling up the scaled-down thumbnail display.

[2] Hardware Configuration of Display Control Apparatus

Figure 1:
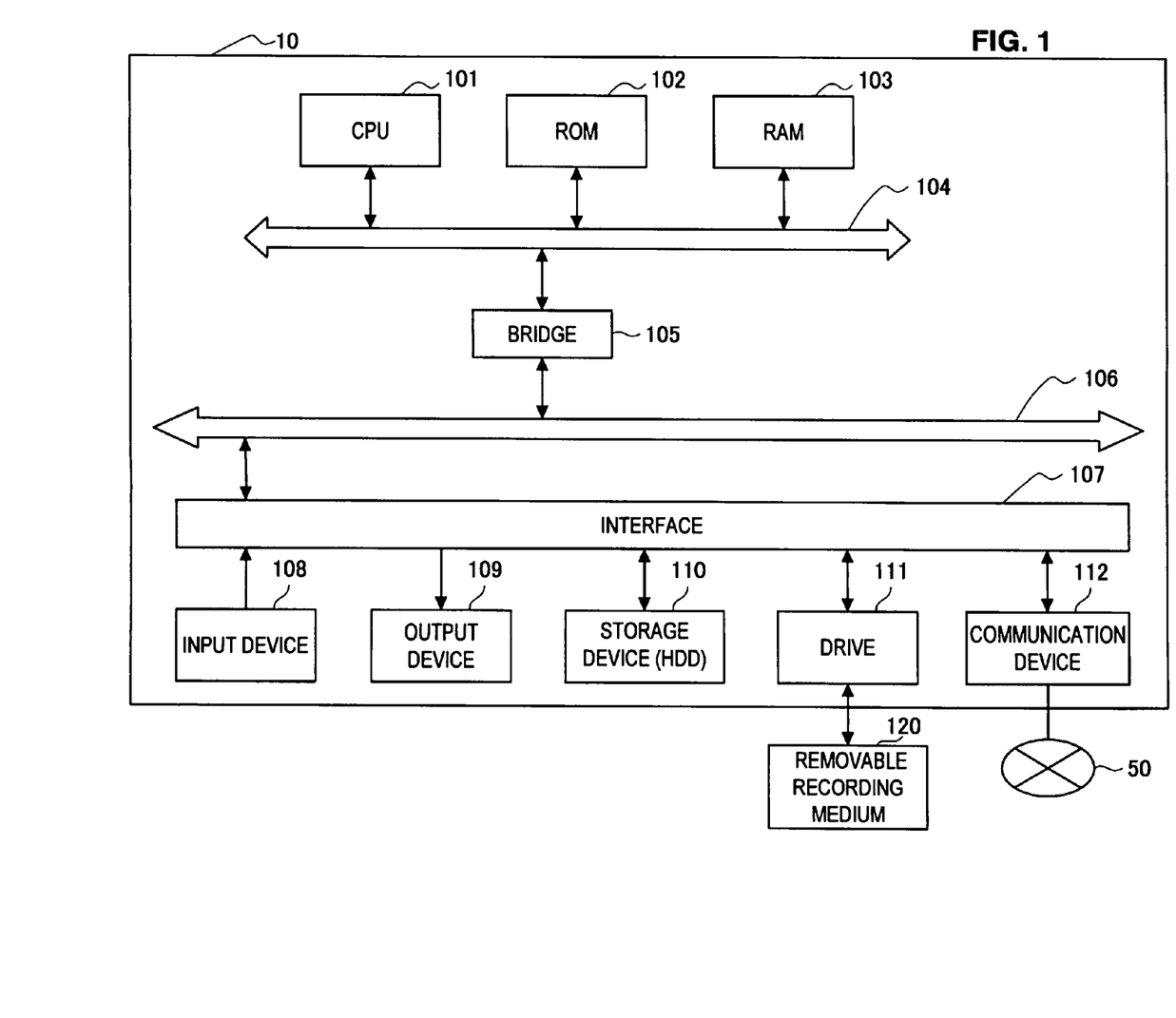
FIG. 1 is an explanatory view exemplifying a hardware configuration of a display control apparatus according to an embodiment of the present invention.

Next, the hardware configuration of the display control apparatus 10 will be described with reference to FIG. 1. FIG. 1 is an explanatory view exemplifying the hardware configuration of the display control apparatus 10 according to the present embodiment.

The display control apparatus 10 includes a CPU (Central Processing Unit) 101, a ROM (Read Only Memory) 102, a RAM (Random Access Memory) 103, a host bus 104, a bridge 105, an external bus 106, an interface 107, an input device 108, an output device 109, and a storage device (HDD) 110, a drive 111, and a communication device 112.

The CPU 101 functions as an arithmetic processing unit and control unit and controls overall operations in the display control apparatus 10 according to various programs. The CPU 101 may be a microprocessor. The ROM 102 stores programs, arithmetic parameters and the like used by the CPU 101. The RAM 103 temporarily stores programs used for execution by the CPU 101 and parameters suitably changing during execution thereof. These units are mutually connected by the host bus 104 constituted by a CPU bus or the like.

The host bus 104 is connected to the external bus 106 like a PCI (Peripheral Component Interconnect/Interface) bus via the bridge 105. Incidentally, the host bus 104, the bridge 105, and the external bus 106 need not to be constituted separately and these functions may be implemented by a single bus.

The input device 108 generates an input signal based on input by a user as an input means for a user to input information such as a mouse, keyboard, touch-panel, button, microphone, switch, and lever and is constituted by an input control circuit or the like to output to the CPU 101. The user of the display control apparatus 10 can input various kinds of data or provide processing operation instructions to the display control apparatus 10 by operating the input device 108.

The output device 109 is constituted by a display device such as a CRT (Cathode Ray Tube) display unit, a liquid crystal display (LCD) unit, OLED (Organic Light Emitting Display) unit, and lamp and an audio output device such as a speaker and headphone. The output device 109 outputs, for example, reproduced content. More specifically, the display device displays various kinds of information such as reproduced video data as text or images. On the other hand, the audio output device converts reproduced audio data or the like into audio for output.

The storage device 110 is a device for data storage constituted as an example of storage unit of the display control apparatus 10 according to the present embodiment and can include a storage medium, a recording device that records data in the storage medium, a read-out device that reads data from the storage medium, and a deletion apparatus that deletes data recorded in the storage medium. The storage device 110 is constituted by, for example, an HDD (Hard Disk Drive). The storage device 110 drives a hard disk and stores programs executed by the CPU 101 and various kinds of data.

The drive 111 is a reader writer for storage medium and is contained in the display control apparatus 10 or attached to the display control apparatus 10 externally. The drive 111 reads information recorded in a removable storage medium 120 such as a mounted magnetic disk, optical disk, magneto-optical disk, and semiconductor memory and outputs the information to the RAM 103.

The communication device 112 is a communication interface constituted by, for example, a communication device to connect to a communication network 50. The communication device 112 may be a wireless LAN (Local Area Network) compatible communication device, wireless USB compatible communication device, or wire communication device that performs communication by wire.

[3] Function Configuration of Display Control Apparatus

Figure 2:
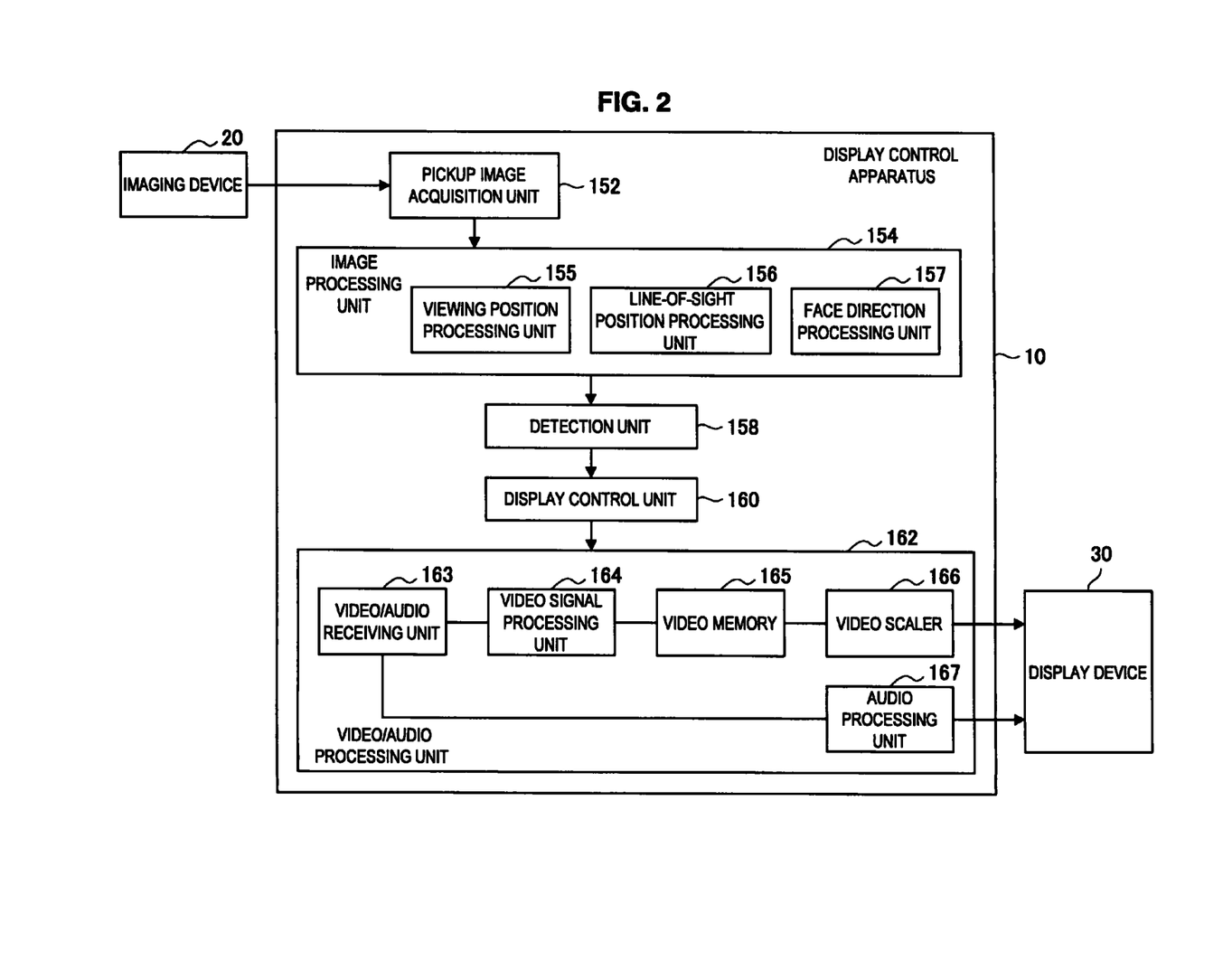
FIG. 2 is a block diagram showing the function configuration of the display control apparatus according to the embodiment.

In the foregoing, the hardware configuration of the display control apparatus 10 has been described. Next, the function configuration of the display control apparatus 10 will be described with reference to FIG. 2. As shown in FIG. 2, the display control apparatus 10 mainly includes a pickup image acquisition unit 152, an image processing unit 154, a detection unit 158, a display control unit 160, and a video/audio processing unit 162.

The pickup image acquisition unit 152 has a function to acquire a pickup image of a viewer viewing display images. The pickup image of the viewer is picked up by an imaging device 20 and provided to the pickup image acquisition unit 152. In the present embodiment, the imaging device 20 is separated from the display control apparatus 10, but the present invention is not limited to such an example and the imaging device 20 and the display control apparatus 10 may be configured as an integrated apparatus. After a viewer being imaged by the imaging device 20, it becomes possible to detect the distance between the viewer and the display control apparatus 10 and to detect the position and the operation of the viewer such as the face orientation and line of sight. The imaging device 20 may be provided in an outer frame portion of a display device 30 to detect the operation of the viewer more correctly.

The pickup image acquisition unit 152 may acquire a pickup image at predetermined intervals or in accordance with a user operation or the like. For example, the pickup image acquisition unit 152 may acquire a pickup image at predetermined intervals after the display device 30 that displays display images being turned on by a user operation. Alternatively, a pickup image of a viewer may be acquired when a user operation is detected. The pickup image acquisition unit 152 provides a pickup image of a viewer to the image processing unit 154.

The image processing unit 154 has a function to extract feature points of a viewer from a pickup image of the viewer provided by the pickup image acquisition unit 152. Feature points of a viewer are, for example, the position and distance of the viewer, face orientation, or line of sight. The image processing unit 154 includes a viewing position processing unit 155, a line-of-sight position processing unit 156, and a face direction processing unit 157.

The viewing position processing unit 155 has a function to extract feature points representing a positional relationship or the distance between the display device 30 and a viewer from a pickup image of the viewer. The viewing position processing unit 155 extracts feature points representing a positional relationship or the distance between the display device 30 and a viewer from the pickup image itself of the viewer using an outline image or the like of the body of the viewer. For example, the size of a face region with respect to a whole image of the viewer may be extracted as feature points to calculate the distance from the feature points. Alternatively, the viewing position processing unit 155 may extract feature points representing a positional relationships or the distance between the display device 30 and a viewer by using a distance sensor using infrared radiation or the like.

The line-of-sight position processing unit 156 has a function to extract feature points representing the line-of-sight position of a viewer from a pickup image of the viewer. The line-of-sight position processing unit 156 may extract, for example, a partial image of eyes of the viewer as feature points to identify the line-of-sight position. The line-of-sight position processing unit 156 calculates coordinates of a line of sight on an image from the partial image of eyes of the viewer. The face direction processing unit 157 has a function to extract feature points representing the face direction of a viewer from a pickup image of the viewer. The face direction processing unit 157 may identify, for example, the position of a face region in an image to extract the skin color of the face region or contours of eyes, the mouth or the like thereof as feature points to identify the face direction.

The image processing unit 154 provides respective feature points provided by the viewing position processing unit 155, the line-of-sight position processing unit 156, and the face direction processing unit 157 to the detection unit 158. The detection unit 158 has a function to detect information about operations of a viewer from feature points based on a pickup image of the viewer provided by the image processing unit 154. The information about operations of a viewer is, for example, position information or distance information of the viewer, information about the face orientation, or information about the line of sight.

For example, the detection unit 158 calculates position information or distance information of the viewer from the size of a face region with respect to a whole image extracted by the viewing position processing unit 155. The detection unit 158 also calculates coordinates of line-of-sight positions on an image from a partial image of eyes of the viewer extracted by the line-of-sight position processing unit 156. The detection unit 158 also identifies the face direction of the viewer from the skin color of the face region extracted by the face direction processing unit 157 or contours of eyes, the mouth or the like thereof.

The detection unit 158 may calculate position information or distance information from information extracted by the viewing position processing unit 155 and information extracted by the line-of-sight position processing unit 156. The detection unit 158 may also calculate the face direction of the viewer from information extracted by the viewing position processing unit 155 and information extracted by the face direction processing unit 157. The detection unit 158 provides information about detected operations of the viewer to the display control unit 160.

The display control unit 160 has a function to change the size of a display image in accordance with the viewing distance of a viewer detected by the detection unit 158 while associating the viewing position of the viewer detected by the detection unit 158 with the display position of the display image. When, for example, a plurality of display images is displayed on a display screen, the display control unit 160 associates the display position of one display image of the plurality of display images with the viewing position of the viewer to cause the display screen to display other display images around the one display image. The display control unit 160 also changes the display number of the plurality of display images in accordance with the viewing distance of the viewer.

Further, the display control unit 160 has a function to change the display number of the plurality of display images in accordance with the viewing distance of the viewer while associating the display position of one display image of the plurality of display images with the viewing position of the viewer. The display control unit 160 also selects and displays one display image of the plurality of display images in accordance with the line-of-sight position of the viewer detected by the detection unit 158. When, for example, a plurality of thumbnails is displayed on the display screen, if the line-of-sight position of the viewer coincides with one of the plurality of thumbnails, the thumbnail may be selected and displayed on a full screen. Alternatively, the thumbnail that coincides with the line-of-sight position of the viewer may be reproduced.

If the face direction of the viewer is detected by the detection unit 158, the plurality of thumbnails displayed on the display screen may be caused to scroll in accordance with the face direction of the viewer. If, for example, the face direction of the viewer is a left direction, the plurality of thumbnails may be caused to scroll in the left direction. In this case, thumbnails positioned outside a displayable region, that is, outside the display screen are caused to erase, and other thumbnails than those displayed are successively displayed are caused to display to the left.

The display of thumbnail by the display control unit 160 will be described with reference to FIGS. 3 to 7. First, display positions of display images and the display number controlled by the display control unit 160 will be described with reference to FIGS. 3A and 3B. The thumbnail display in which a plurality of display images is scaled down and displayed in one screen will be described below.

Figure 3A:
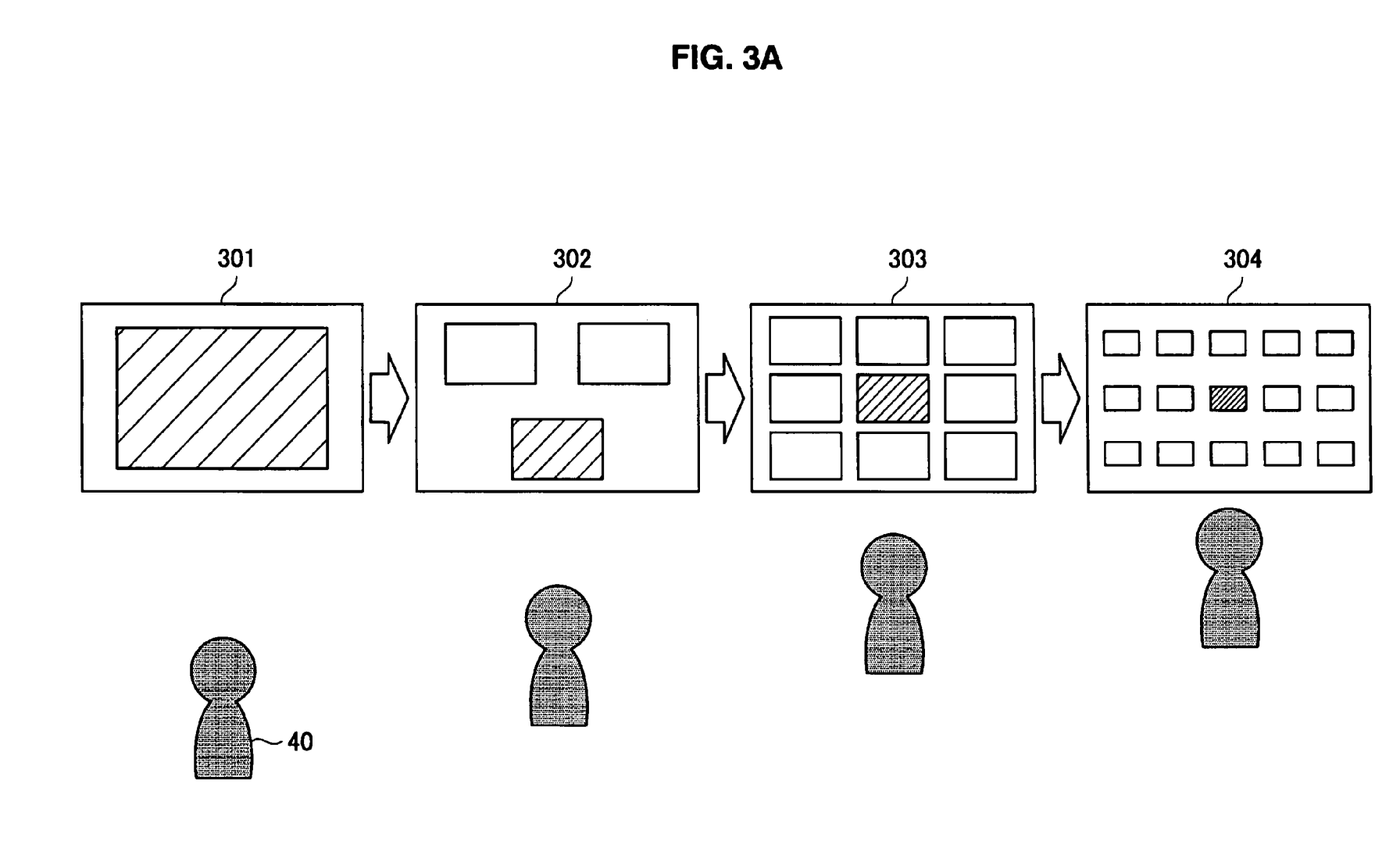
FIG. 3A is an explanatory view illustrating display positions of display images and a display number according to the embodiment.

FIG. 3A is an explanatory view illustrating a relationship between the distance of a viewer and the thumbnail display. It is assumed that, as shown in FIG. 3A, a viewer 40 is positioned in the center of a display screen 301 and gradually approaches the display screen 301. On the display screen 301, content viewed by the viewer 40 is being reproduced. On the display screen 301, the content being reproduced is displayed on a full screen.

As the viewer 40 approaches the display screen 301, the display control unit 160 displays the display screen 301 like a display screen 302. That is, the display size of the content being reproduced on the display screen 301 is scaled down and other content is displayed together with the content concerned (display screen 302). The display position of the content being viewed by the viewer 40 is decided in accordance with the position of the viewer detected by the detection unit 158. The number and size of thumbnails displayed on the display screen 302 is decided in accordance with the distance between the viewer detected by the detection unit 158 and the display device 30.

In FIG. 3A, the viewer 40 is positioned in the center of the display screen 301 and thus, the content being viewed is arranged in the center in the lower part of the display screen 302. Moreover, three thumbnails are displayed on the display screen 302. If a thumbnail displayed on the display screen 302 represents moving images, for example, the content being viewed may be reproduced unchanged after the display region thereof being scaled down with other content being thumbnails of still images.

As the viewer 40 further approaches the display screen 302, the thumbnail being viewed by the viewer 40 is scaled down and arranged in the center and nine thumbnails are displayed on a display screen 303. As the viewer 40 further approaches the display screen 303, the thumbnail being viewed by the viewer 40 is scaled down and arranged in the center and 15 thumbnails are displayed on a display screen 304. As described above, the display position of the thumbnail being viewed by the viewer 40 is decided in accordance with the position of the viewer and the display number and size of thumbnails are decided in accordance with the distance between the viewer 40 and the display device 30.

Figure 3B:
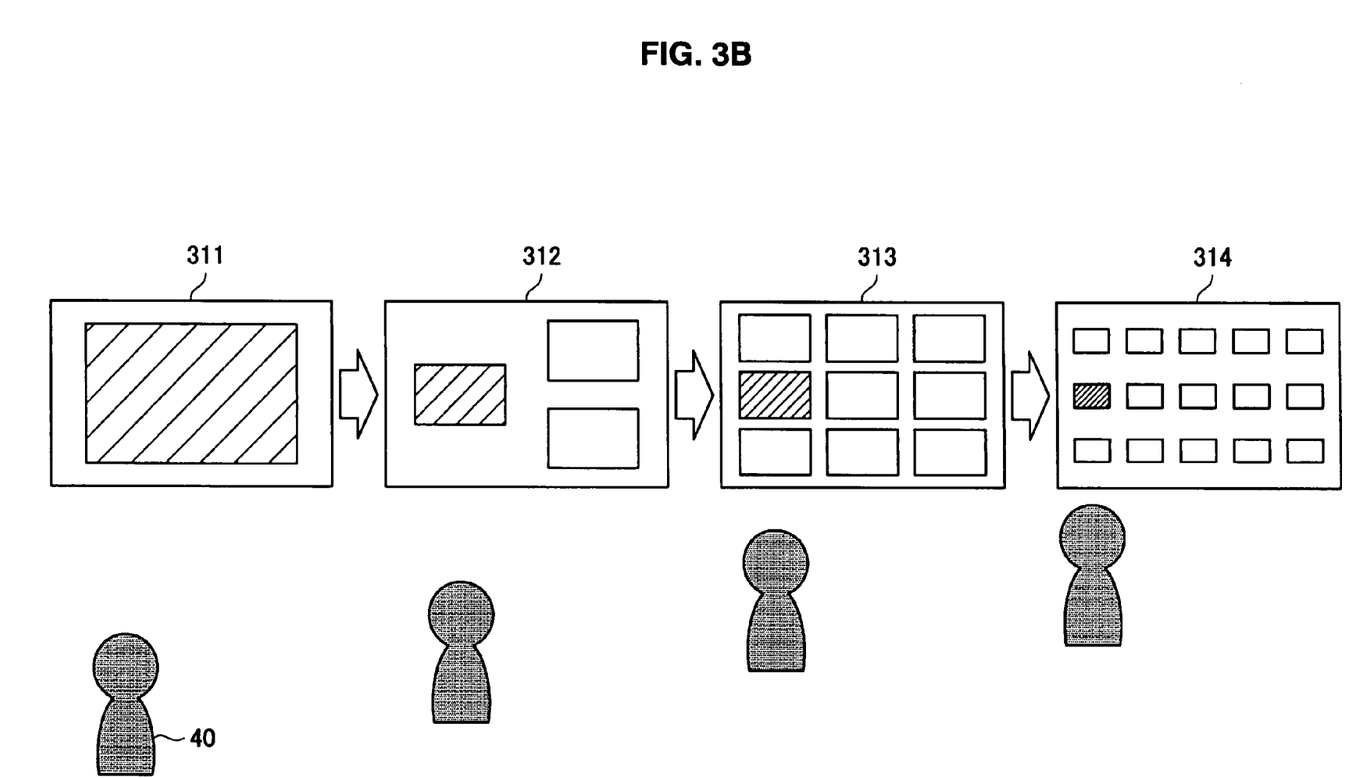
FIG. 3B is an explanatory view illustrating display positions of display images and the display number according to the embodiment.

It is assumed in FIG. 3B that the viewer 40 is positioned on the left side of a display screen 311. Also in this case, the display position of the content being viewed by the viewer 40 is decided in accordance with the position of the viewer detected by the detection unit 158. That is, if the viewer 40 approaches the display screen 311 while being positioned on the left side of the display screen 311, the display size of the content being reproduced on the display screen 311 is scaled down and other content is displayed together with the content concerned.

The viewer 40 is positioned, as described above, on the left side of a display screen 311 and thus, as shown on a display screen 312, three thumbnails are displayed with the content being viewed being arranged on the left side as the viewer 40 approaches the display screen 311. As the viewer 40 further approaches the display screen 312, the thumbnail being viewed by the viewer 40 is arranged in the center on the left side and nine thumbnails are displayed on a display screen 313. As the viewer 40 further approaches the display screen 313, the thumbnail being viewed by the viewer 40 is scaled down and arranged in the center on the left side, and 15 thumbnails are displayed on a display screen 314.

Figure 4:
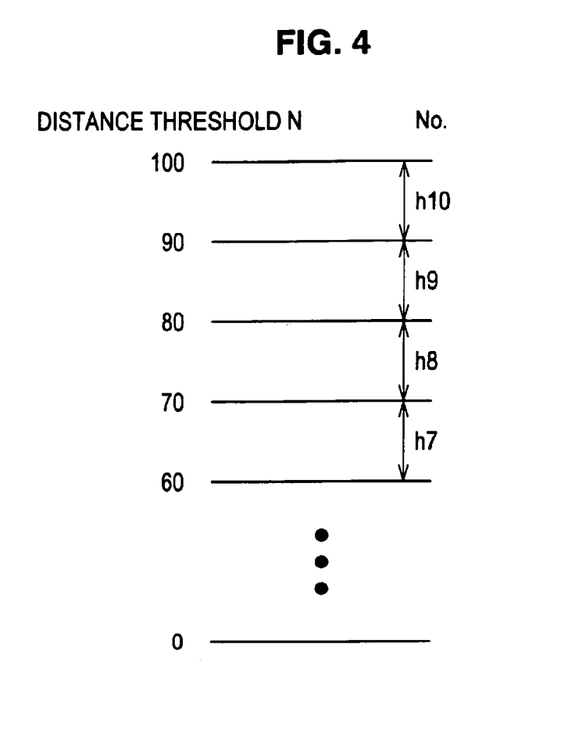
FIG. 4 is an explanatory view illustrating the display number and size of thumbnails according to the embodiment.

The display number and size of thumbnails will be described with reference to FIGS. 4 and 5. FIG. 4 is an explanatory view illustrating the display number and size of thumbnails. A case in which, for example, as shown in FIG. 4, a group of distance thresholds ranges from 0 to 100 in increments of 10 will be described. As the group of distance thresholds, for example, 0 to 9 are set as h1, 10 to 19 as h2, 20 to 29 as h3, 30 to 39 as h4, 40 to 49 as h5, 50 to 59 as h6, 60 to 69 as h7, 70 to 79 as h8, 80 to 89 as h9, and 90 to 99 as h10. If the distance between the viewer 40 and the display device 30 detected by the detection unit 158 is 65, the distance information is compared with the threshold information to determine that the threshold information of h7 is applicable.

Figure 5:
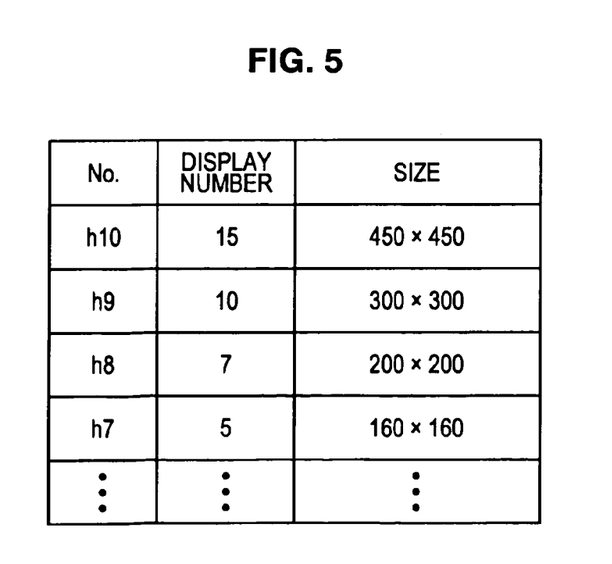
FIG. 5 is an explanatory view illustrating the display number and size of thumbnails according to the embodiment.

If, as shown in FIG. 5, distance information, the display number, and the size are associated, the display number and size of thumbnails to be displayed on the display screen can be decided from the distance information. FIG. 5 is an explanatory view illustrating a mapping example of the display number and size of thumbnails with respect to the distance. If, for example, the distance is between 60 and 70, the distance information (No.) of "h7" applies so that the display number of thumbnails is decided to be five and the size thereof to be 160×160. The method of deciding the display number and size of thumbnails will be described below.

Figure 6:
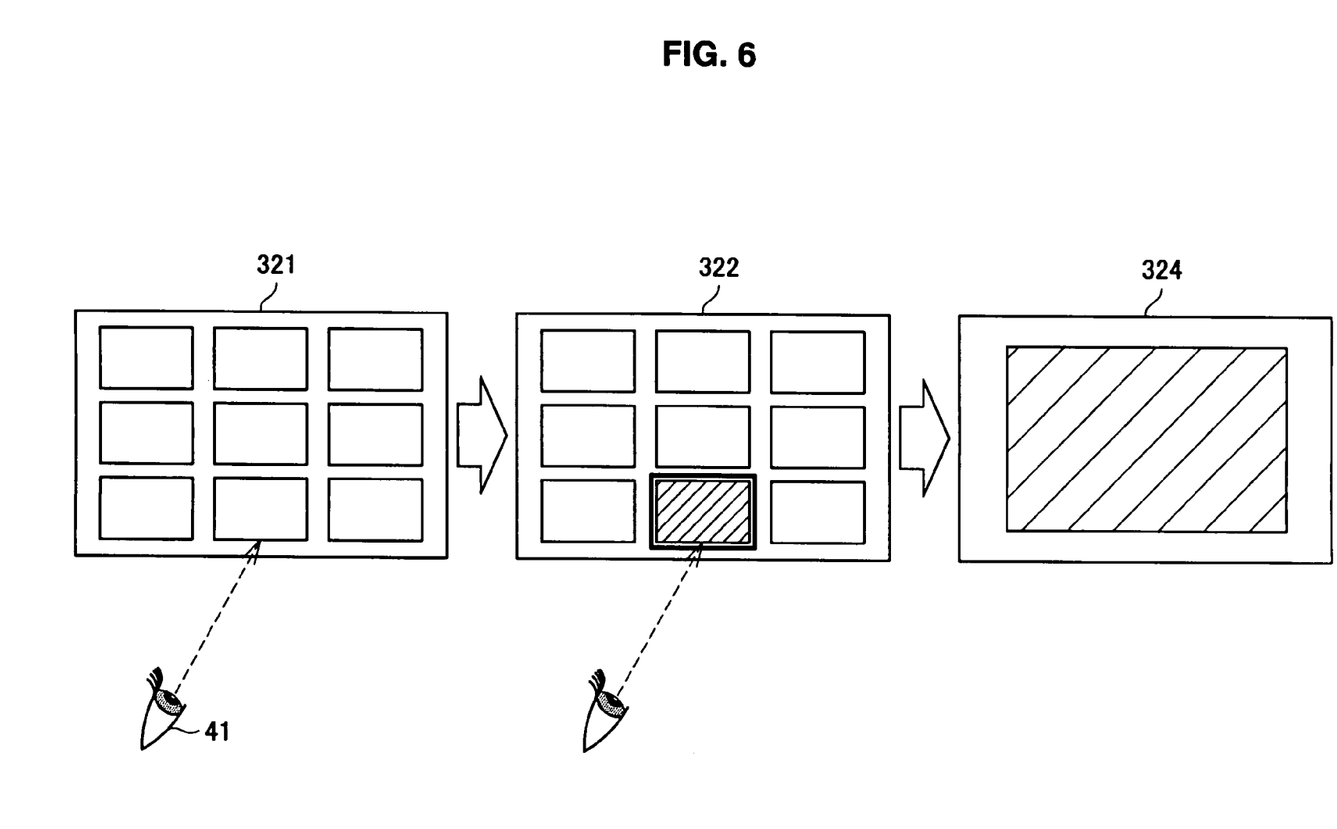
FIG. 6 is an explanatory view illustrating the display of thumbnail in accordance with a line-of-sight position of a viewer according to the embodiment.

Next, the display of thumbnail in accordance with the line-of-sight position of a viewer controlled by the display control unit 160 will be described with reference to FIG. 6. It is assumed that, as shown in FIG. 6, a line of sight 41 of the viewer coincides with a thumbnail indicated by an arrow among a plurality of thumbnails displayed on a display screen 321. Then, on a display screen 322, a thumbnail coinciding with the line of sight 41 of the viewer is displayed in such a way to indicate that the thumbnail is selected.

On the display screen 322, a double display frame may be used for a selected thumbnail or a color different from that of other thumbnails may be arranged to make the thumbnail selection visually recognizable. Alternatively, the thumbnail selection may be made visually recognizable by an arrow or the like. Then, if the line of sight 41 of the viewer coincides with the selected thumbnail for a predetermined time, the thumbnail is caused to display on a full screen to reproduce content (display screen 324).

Figure 7:
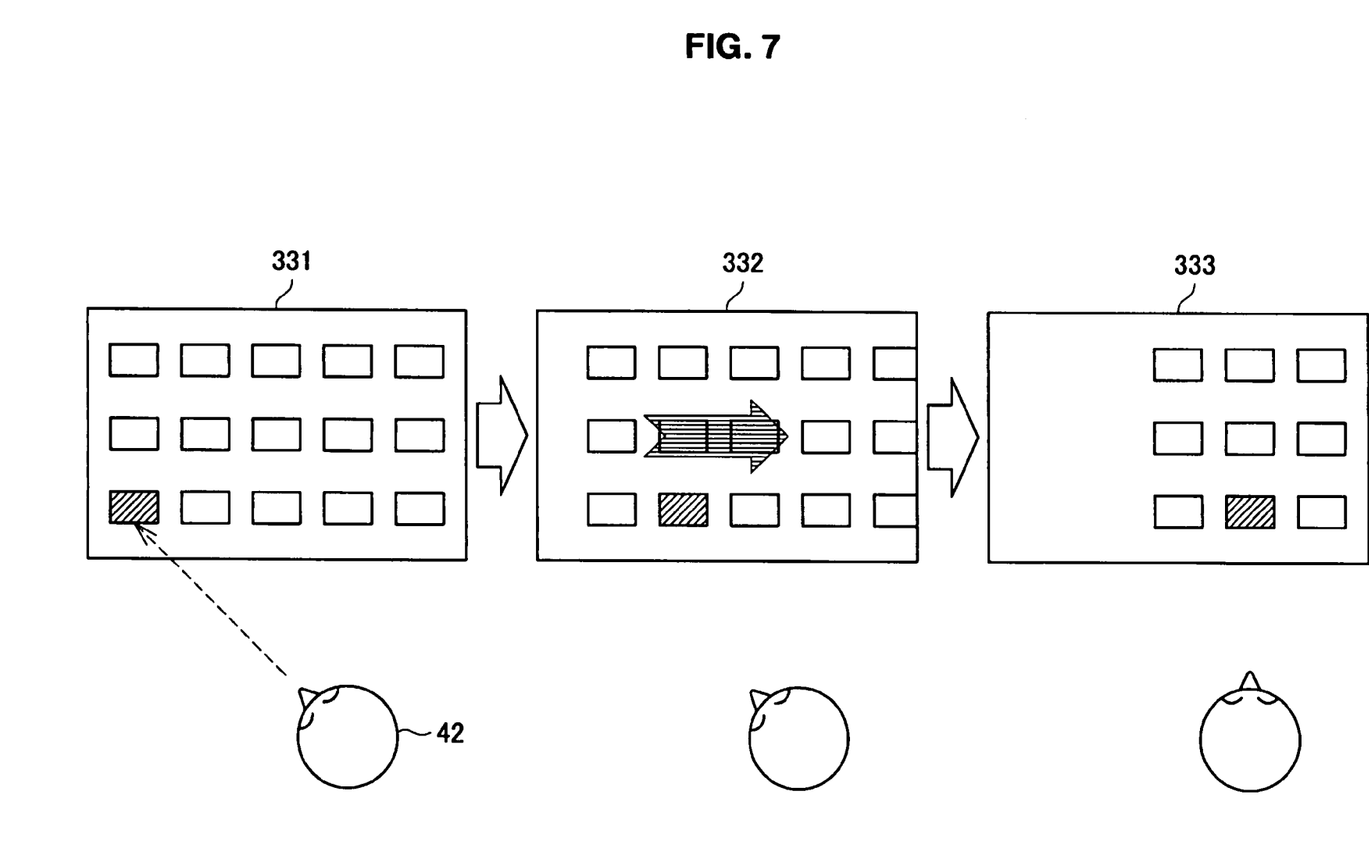
FIG. 7 is an explanatory view illustrating the display of thumbnail in accordance with a face direction of the viewer according to the embodiment.

Next, the display of thumbnail in accordance with the face direction of a viewer controlled by the display control unit 160 will be described with reference to FIG. 7. As shown in FIG. 7, a plurality of thumbnails that are as many thumbnails displayable in a display screen as possible is displayed on a display screen 331. Then, if the viewer is detected that a face direction 42 thereof is in the left direction, as shown on a display screen 332, thumbnails are scrolled in the right direction, which is the direction opposite to the face direction 42 of the viewer. While thumbnails are caused to scroll in accordance with the face direction of the viewer in FIG. 7, thumbnails may also be caused to scroll in accordance with the line-of-sight direction of the viewer. Alternatively, as shown on a display screen 333, when thumbnails to be displayed are all displayed, scrolling may be stopped. Alternatively, when the viewer is oriented toward the front, scrolling may be stopped. In the foregoing, the display of thumbnail by the display control unit 160 has been described.

Returning to FIG. 2, the description of the function configuration of the display control apparatus 10 will be continued. The display control unit 160 provides display control information such as the number and size of thumbnails and thumbnail positions to the video/audio processing unit 162. The video/audio processing unit 162 includes a video/audio receiving unit 163, a video signal processing unit 164, a video memory 165, a video scaler 166, and an audio processing unit 167. After video and audio being received by the video/audio receiving unit 163, the received signal is amplified and detected to separate the signal into a video signal and an audio signal before being output to the video signal processing unit 164 and the audio processing unit 167 respectively.

The video signal processing unit 164 adjusts and encodes a video signal output from the video/audio receiving unit 163 and outputs an adjusted video signal to the video memory 165. The audio processing unit 167 adjusts and encodes an audio signal output from the video/audio receiving unit 163. The video signal output to the video memory 165 is adjusted by the video scaler 166 to the video size instructed by the display control unit 160 or in accordance with the size of the display before being output to the display device 30.

[4] Details of Image Display Processing in Display Control Apparatus

Figure 8:
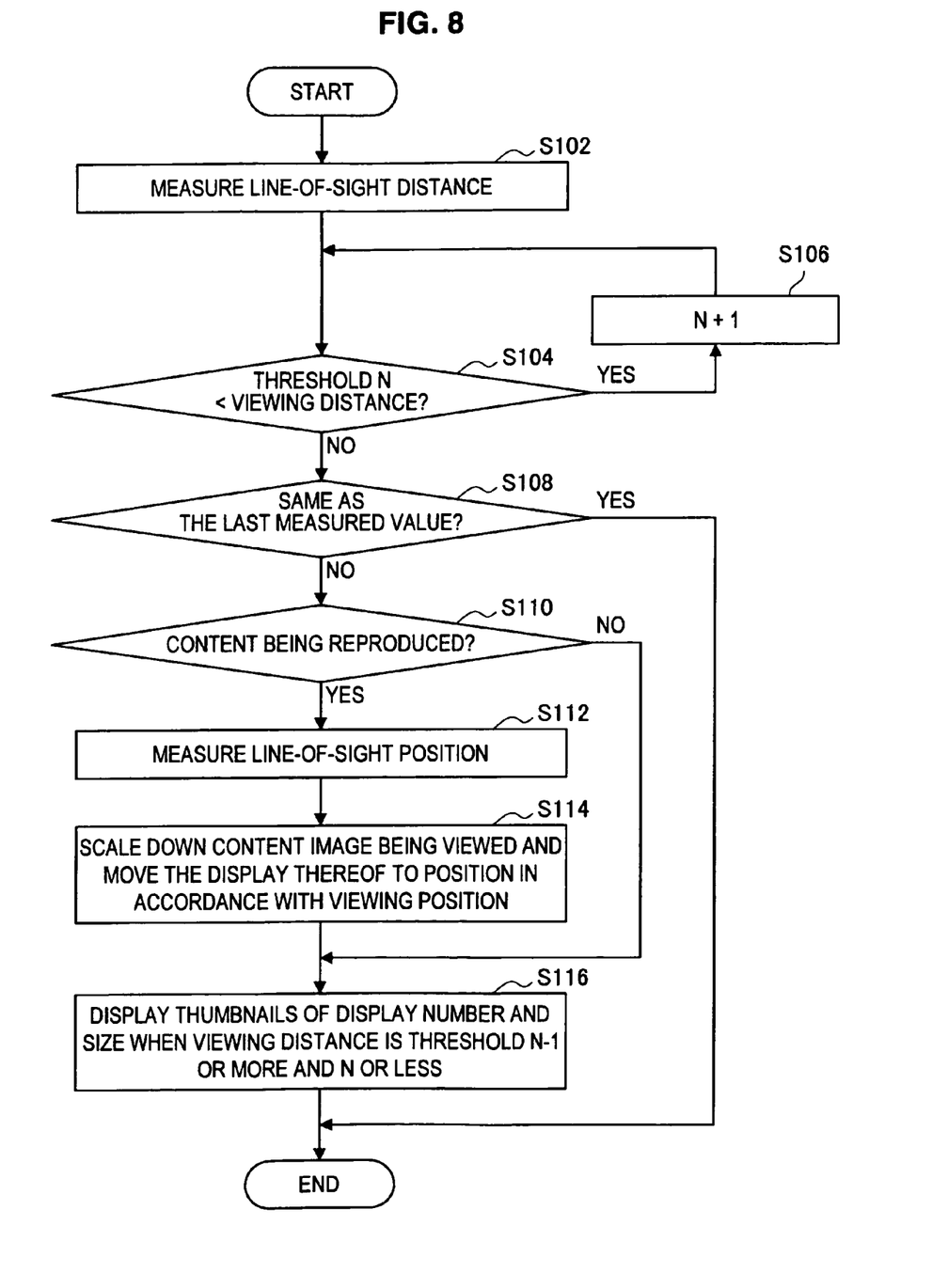
FIG. 8 is a flow chart showing image display processing in accordance with the position of the viewer according to the embodiment.

In the foregoing, the function configuration of the display control apparatus 10 has been described. Next, details of image display processing in the display control apparatus 10 will be described with reference to FIGS. 8 to 10. FIG. 8 is a flow chart showing image display processing in accordance with the position of a viewer. As shown in FIG. 8, the size of the face of the viewer imaged by the imaging device 20 is first recognized by the viewing position processing unit 155 and the distance between the viewer and the display device 30 is measured by the detection unit 158 (S102). The distance is measured based on the size of the face of a viewer in step S102, but the present invention is not limited to such an example and the distance may be measured based on the size of something other than the face such as the nose of a viewer.

Next, the display control unit 160 compares distance information measured in step S102 with pre-registered threshold information (S104). More specifically, the display control unit 160 compares threshold information N and the size of a viewing distance. If the viewing distance is larger than the threshold N, a value of the threshold N is added (S106). It is assumed that, for example, the distance calculated in step S104 is 10 and a pre-registered threshold group ranges from 0 to 100 in increments of 10. In this case, the threshold 0 and the distance 10 are first compared in step S104. Since the distance 10 is larger than the threshold 0 in the comparison in step S104, 1 is added to the threshold 0. In this case, processing in step S108 is performed when the threshold becomes 10.

Then, the display control unit 160 determines whether the viewing distance measured in step S102 is the same as the viewing distance measured last time (S108). If the viewing distance is the same as the measured value of the viewing distance measured last time in step S108, the processing is terminated. If the display control unit 160 determines that the viewing distance is not the same as the measured value of the viewing distance measured last time in step S108, the display number and size of images are decided according to mapping between the threshold and display number shown in FIG. 5 (S110).

Next, the display control unit 160 determines whether content is being reproduced (S112). If the display control unit 160 determines that content is being reproduced in step S112, the position of the viewer is measured (S114). The position measurement in step S114 measures right and left positions of the viewer with respect to the display device 30. Then, the content being viewed by the viewer is scaled down and displayed and then the content is moved in accordance with the position of the viewer (S116).

If, for example, the viewer is positioned on the right side with respect to the display device 30, the scaled-down content is moved to the right. If the viewer is positioned on the left side with respect to the display device 30, the scaled-down content is moved to the left. The reduction ratio of content in step S116 is changed in accordance with the size of image decided in step S110.

The movement position of content is arranged at an optimal position in accordance with the display number of images decided in step S110. The optimal position in accordance with the display number is when the viewer positioned, for example, as shown in FIG. 3B, on the left side, content being reproduced is arranged on the left side as shown on the display screen 312. If the display number increases, as shown on the display screens 313 and 314, content being reproduced is arranged in the center on the left side.

Then, a plurality of thumbnails is displayed in the display number and size when the viewing distance decided in step S110 is the threshold N−1 or more and the threshold N or less (S118). If the number of pieces of content displayed on the display screen in step S118 is the maximum number of pieces of the content, the content being reproduced may be stopped. This is because if a large number of pieces of content are displayed on the display screen and the size of each piece of content becomes minimum, details of content may not be visually recognizable even if the content is reproduced.

Thus, according to the present embodiment, it becomes possible to change the display number and size of thumbnails in accordance with the distance between the viewer and the display device 30 or the position thereof or to arrange the thumbnail being reproduced at a position easily viewable from the viewer.

Figure 9:
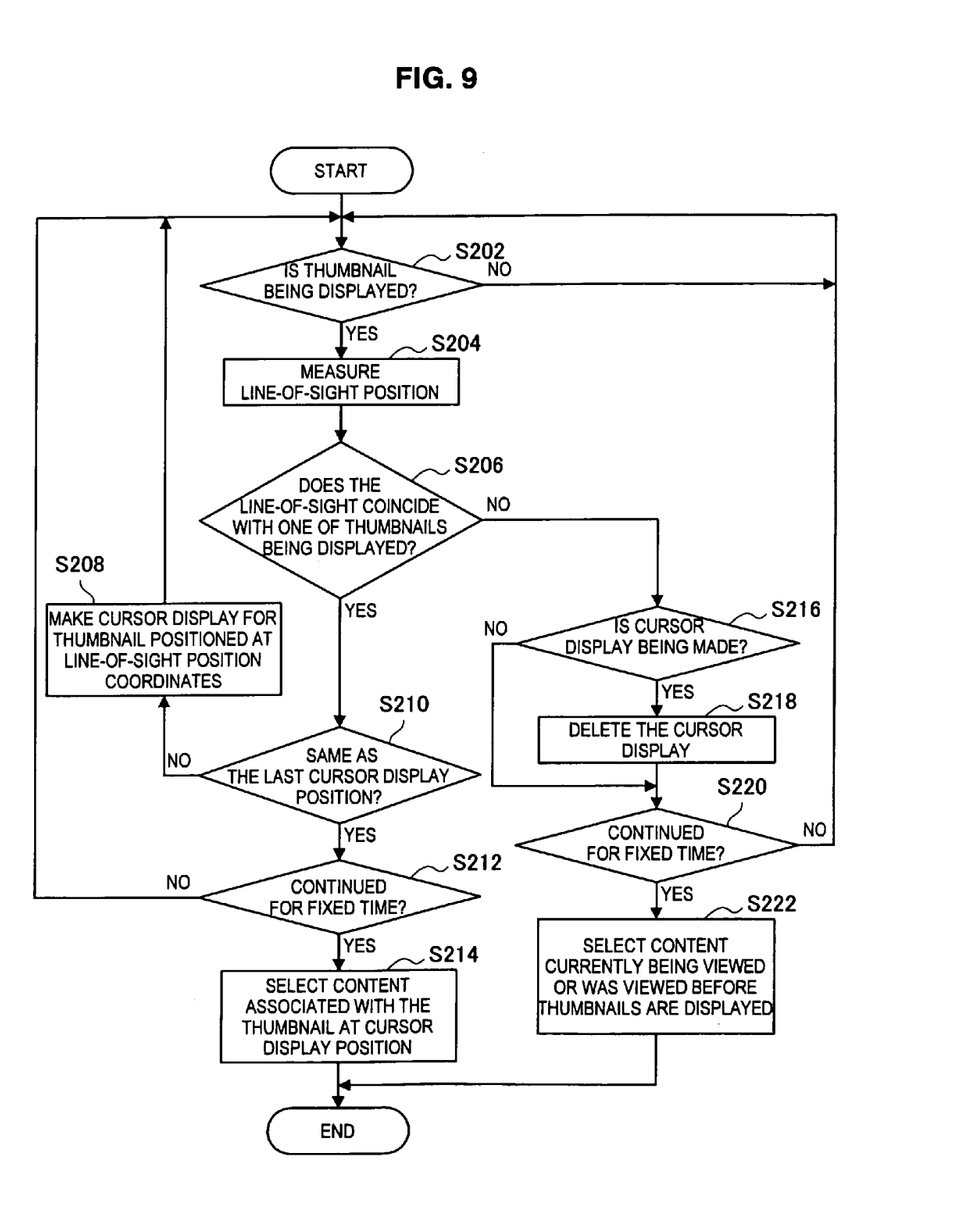
FIG. 9 is a flow chart showing the image display processing in accordance with the line of sight of the viewer according to the embodiment.

Next, details of image display processing in accordance with the line of sight of a viewer will be described with reference to FIG. 9. FIG. 9 is a flow chart showing the image display processing in accordance with the line of sight of a viewer. As shown in FIG. 9, whether any thumbnail is displayed on the display screen is first determined (S202). If it is determined in step S202 that a thumbnail is displayed, the detection unit 158 calculates coordinates of the line-of-sight position on the screen from a partial image of eyes extracted by the line-of-sight position processing unit 156 (S204).

Then, whether the line-of-sight position of the viewer calculated in step S204 coincides with the position of any thumbnail being displayed is determined (S206). If it is determined in step S206 that the line-of-sight position of the viewer is positioned in one of thumbnails being displayed, whether the line-of-sight position is the same as the last display position of the cursor is determined (S210). The cursor display in step S210 is a display that makes the selection of a thumbnail recognizable. A case when it is determined in step S206 that the line-of-sight position of the viewer is not positioned in any thumbnail being displayed will be described in detail below.

Then, if it is determined in step S210 that the line-of-sight position is the same as the last display position of the cursor, whether the cursor display has continued for a fixed time (S212). If it is determined in step S210 that the line-of-sight position is not the same as the last display position of the cursor, a cursor display is made for the thumbnail at coordinates of the current viewing position (S208). Then, processing in steps S202 to S210 is repeated.

If it is determined in step S212 that the cursor display has continued for a fixed time, content associated with the thumbnail positioned in the cursor display is selected (S214). In step S214, content associated with the selected thumbnail may be reproduced in a full-screen display. Accordingly, content desired by the viewer to reproduce can automatically be caused to reproduce without using any remote control.

If it is determined in step S206 that the line-of-sight position of the viewer does not coincide with any thumbnail being displayed, next whether the cursor display is currently made is determined (S216). If it is determined in step S216 that the cursor display is currently made, the cursor display concerned is deleted (S218). When the line-of-sight position of the viewer does not coincide with any thumbnail in step S206, the viewer is not looking at thumbnails and thus, the cursor display to select one thumbnail is deleted. If it is determined in step S216 that the cursor display is not currently made, processing in step S220 is performed.

Then, it is determined whether the fixed time has passed (S220). If the fixed time has passed in step S220, after determining that the viewer is not looking at content displayed as a thumbnail, the list display of thumbnails is deleted and the content currently being viewed or was being viewed before the display of thumbnails is reproduced on a full screen (S222). If the fixed time has not passed in step S220, processing returns to step S202.

Figure 10:
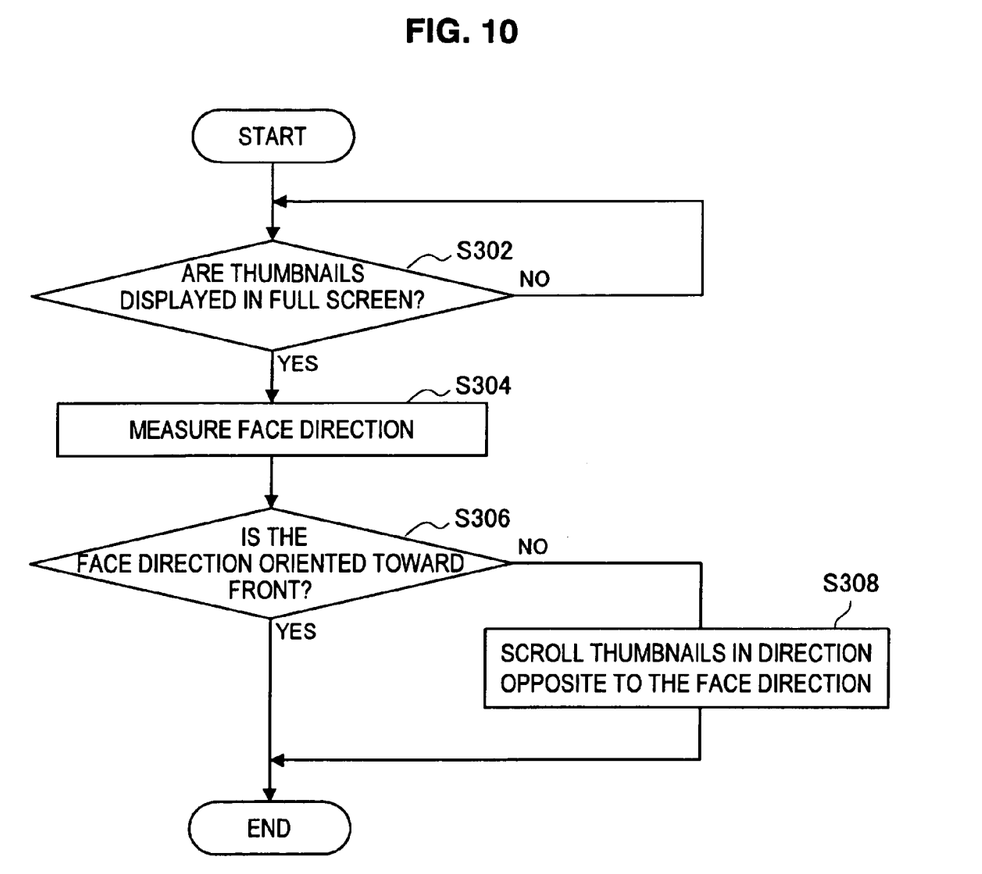
FIG. 10 is a flow chart showing the image display processing in accordance with the face direction of the viewer according to the embodiment.

In the foregoing, the image display processing in accordance with the line of sight of the viewer has been described in detail. Next, details of image display processing in accordance with the face direction of a viewer will be described with reference to FIG. 10. FIG. 10 is a flow chart showing the image display processing in accordance with the face direction of a viewer. As shown in FIG. 10, whether thumbnails are displayed on a full screen, that is, it is determined the maximum number of thumbnails displayable in the display screen are displayed (S302). The case when thumbnails are displayed in the full screen in step S302 is a case when a viewer approaches the display screen, the number of thumbnails displayed on the display screen increases, and the maximum number of thumbnails displayable in the display screen is displayed in the end.

If it is determined in step S302 that thumbnails are displayed in the full screen, the detection unit 158 measures the face direction of the viewer (S304). In step S304, the detection unit 158 calculates the face direction from the skin color of a face region in an image extracted by the face direction processing unit 157 or contours of eyes, the mouth or the like thereof. Then, it is determined whether the face direction measured in step S304 is oriented toward the front (S306).

If it is determined in step S306 that the face direction is not oriented toward the front, thumbnails are scrolled in a direction opposite to the face direction (S308). If, for example, the face orientation of the viewer is the right direction in step S308, thumbnails are caused to scroll in the left direction. If the face orientation of the viewer is the left direction, thumbnails are caused to scroll in the right direction.

Causing thumbnails to scroll means that thumbnails are translated and, as a result, thumbnail images that go out of the displayable region of the display screen are deleted to display new thumbnails in an empty space created by the translation of the thumbnails. Accordingly, even if it is difficult to display all displayable thumbnails in the display screen, new thumbnails can successively be recognized visually without performing a cumbersome remote control operation.

In the foregoing, the image display processing in accordance with the face direction of the viewer has been described in detail. According to the display control apparatus 10 in the present embodiment, as described above, the viewing position and viewing distance of a viewer from a display image can be detected based on a pickup image of the viewer viewing the display image and the size of the display image can be changed in accordance with the viewing distance while associating the detected viewing position of the viewer with the display position of the display image. Accordingly, display images such as thumbnails can appropriately be caused to display in accordance with the distance or position of a viewer.

If there is content being reproduced, a display screen can be caused to make a thumbnail display of other content without stopping the reproduction thereof. Further, when the display screen is caused to make a thumbnail display of other content, positions of thumbnails can be adjusted in line with the position of the viewer or thumbnails can be scaled down.

Further, the thumbnail display can be adjusted in accordance with the position of the viewer without remote control operation by the viewer. Further, by recognizing the face orientation or line of sight of the viewer, it becomes possible to change the position of the thumbnail display or to select content associated with a thumbnail. When the viewer moves away from the display screen, visibility of thumbnails can be improved without performing a remote control operation by scaling up the scaled-down thumbnail display.

It becomes also possible to change the display number or size of thumbnails or to reproduce content according to the position of the viewer or the orientation of the line of sight or face thereof. Therefore, the display of images can appropriately be controlled according to the position of the viewer or the orientation of the line of sight or face thereof without complicated operations by hand or an exaggerated gesture.

It should be understood by those skilled in the art that various modifications, combinations, sub-combinations and alterations may occur depending on design requirements and other factors insofar as they are within the scope of the appended claims or the equivalents thereof.

For example, each step in processing of the display control apparatus 10 herein need not necessarily be processed chronologically in the order described as a flow chart. That is, each step in processing of the display control apparatus 10 may include processing performed in parallel or individually (for example, parallel processing or processing by an object).

Moreover, a computer program causing hardware such as a CPU, ROM, and RAM contained in the display control apparatus 10 to exhibit a function equivalent to that of each unit of the display control apparatus 10 described above can be created. A storage medium causing the computer program to store is also provided.

What is claimed is:

1. A display control apparatus, comprising: a processor; and a memory having stored thereon instructions which when executed by the processor cause the processor to perform as:
   a pickup image acquisition unit that acquires a pickup image of a viewer viewing a number of display images on a display screen;
   a detection unit that detects a face direction, a viewing position, and a viewing distance of the viewer with respect to a display image based on the pickup image of the viewer acquired by the pickup image acquisition unit; and
   a display control unit that causes the display image or images to scroll in accordance with the detected face direction of the viewer, and causes other display image or images than the currently displayed display image or images to be displayed,
   wherein the viewing position provides an indication as to which side of the display screen the viewer is positioned and the viewing distance provides an indication as to a distance between the viewer and the display image or images,
   wherein the display control unit is configured to decide which image the viewer is currently viewing in accordance with the detected viewing position such that if the viewer is positioned on a left side of the display screen the display control unit decides that the viewer is currently viewing an image on the left side of the display screen and if the viewer is positioned on a right side of the display screen the display control unit decides that the viewer is currently viewing an image on the right side of the display screen,
   wherein the display control unit associates at least one of (i) a size of a display image or images, or (ii) a number of displayed images with the viewing distance of the viewer, and controls positions of images on the display screen in accordance with the image which is decided as being currently viewed by the viewer, and
   wherein the viewing position of the viewer is independent of viewer's line of sight.

2. The display control apparatus according to claim 1, wherein the display image or images are content being reproduced.

3. The display control apparatus according to claim 1, wherein the detection unit detects a line-of-sight position of the viewer based on the pickup image of the viewer acquired by the pickup image acquisition unit and
   the display control unit selects and displays one display image from the number of display images in accordance with the line-of-sight position of the viewer detected by the detection unit.

4. The display control apparatus according to claim 3, wherein if the one display image is selected and displayed for a predetermined time or longer in accordance with the line-of-sight position of the viewer, the display control unit causes the display screen to reproduce content associated with the one display image.

5. The display control apparatus according to claim 1, wherein the display control unit causes the display image to scroll in a direction opposite to at least one of the detected face direction or a line-of-sight of the viewer.

6. A display control apparatus, comprising: a processor; and a memory having stored thereon instructions which when executed by the processor cause the processor to perform as:
   a pickup image acquisition unit that acquires a pickup image of a viewer viewing a display image;
   a detection unit that detects a viewing position of the viewer with respect to the display image based on the pickup image of the viewer acquired by the pickup image acquisition unit; and
   a display control unit that associates the viewing position of the viewer detected by the detection unit with a display position of the currently displayed display image, and causes the display image to scroll in accordance with the viewing position of the viewer, and causes other display image than the currently displayed display image to be displayed, wherein the display control unit deletes a display image positioned outside a displayable region of the display screen after causing the display image to scroll in accordance with the viewing position of the viewer.

7. A display control apparatus, comprising: a processor; and a memory having stored thereon instructions which when executed by the processor cause the processor to perform as:
a pickup image acquisition unit that acquires a pickup image of a viewer viewing a display image;
a detection unit that detects a viewing position of the viewer with respect to the display image based on the pickup image of the viewer acquired by the pickup image acquisition unit; and
a display control unit that causes a display screen to display a plurality of display images, and deletes display images positioned outside a displayable region of the display screen after causing the plurality of display images to scroll in a horizontal direction and causes the display screen to display other display images than the plurality of display images in the displayable region of the display screen where the other display images are not currently displayed.

8. A display control method, comprising the steps of:
acquiring a pickup image of a viewer viewing a number of display images on a display screen;
detecting, by using a processor, a face direction, a viewing position, and a viewing distance of the viewer with respect to the display image based on the acquired pickup image of the viewer;
causing the display image or images to scroll in accordance with the detected face direction of the viewer, and causing other display image or images than the currently displayed display image or images to be displayed in the displayable region of the display screen,
wherein the viewing position provides an indication as to which side of the display screen the viewer is positioned and the viewing distance provides an indication as to a distance between the viewer and the display image or images, and further comprising the steps of:
deciding which image the viewer is currently viewing in accordance with the detected viewing position such that if the viewer is positioned on a left side of the display screen the display control unit decides that the viewer is currently viewing an image on the left side of the display screen and if the viewer is positioned on a right side of the display screen the display control unit decides that the viewer is currently viewing an image on the right side of the display screen; and
associating at least one of (i) a size of a display image or images, or (ii) a number of displayed images with the viewing distance of the viewer, and controlling positions of images on the display screen in accordance with the image which is decided as being currently viewed by the viewer, and
wherein the viewing position of the viewer is independent of viewer's line of sight.

9. The method according to claim 8, further comprising, in case that a plurality of display images are displayed on the display section, the steps of:
controlling a number of display images in accordance with the viewing distance of the viewer.

10. The method according to claim 8, wherein the display image or images are content being reproduced.

11. The method according to claim 8, further comprising, in case that a plurality of display images are displayed on the display section, the steps of:
detecting a line-of-sight position of the viewer based on the acquired pickup image of the viewer; and
selecting and displaying one display image from the plurality of display images in accordance with the line-of-sight position of the viewer.

12. The method according to claim 11, further comprising the step of
causing reproduction of content associated with the one display image after the one display image is selected and displayed for a predetermined time or longer in accordance with the line-of-sight position of the viewer.

13. The method according to claim 8, wherein the display image is caused to scroll in a direction opposite to at least one of the detected face direction or a line-of-sight of the viewer.

* * * * *